United States Patent
Wang et al.

(10) Patent No.: US 11,435,935 B2
(45) Date of Patent: Sep. 6, 2022

(54) SHRINKING SEGMENT CLEANING ALGORITHM IN AN OBJECT STORAGE

(71) Applicant: VMware, Inc., Palo Alto, CA (US)

(72) Inventors: Wenguang Wang, Santa Clara, CA (US); Petr Vandrovec, Palo Alto, CA (US); Hardik Singh Negi, Palo Alto, CA (US); Junlong Gao, Mountain View, CA (US); Vamsi Gunturu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/100,663

(22) Filed: Nov. 20, 2020

(65) Prior Publication Data
US 2022/0164125 A1 May 26, 2022

(51) Int. Cl.
*G06F 3/06* (2006.01)
(52) U.S. Cl.
CPC .......... *G06F 3/0652* (2013.01); *G06F 3/0604* (2013.01); *G06F 3/0644* (2013.01); *G06F 3/0659* (2013.01); *G06F 3/0673* (2013.01)

(58) Field of Classification Search
CPC .... G06F 3/0673; G06F 3/0659; G06F 3/0644; G06F 3/0604; G06F 3/0652
See application file for complete search history.

(56) References Cited

U.S. PATENT DOCUMENTS

2018/0137055 A1* 5/2018 Veeraraghavan ... G06F 12/0864
2020/0387309 A1* 12/2020 Eom ...................... G06F 3/061

* cited by examiner

*Primary Examiner* — Edward J Dudek, Jr.
(74) *Attorney, Agent, or Firm* — Patterson + Sheridan, LLP (57) ABSTRACT

A method for cleaning an object storage having a plurality of segments is provided. Each segment includes an identifier through which the segment is accessed. The method identifies a first segment in the plurality of segments. The first segment includes a first identifier and a first size. The method determines that a utilization ratio for the first segment is below a threshold. As a result, the method generates a second segment from the first segment, such that the second segment includes a second identifier that is the same as the first identifier and a second size that is smaller than the first size. The method then writes the second segment to the object storage.

14 Claims, 4 Drawing Sheets

LFS 310

| Segment-A | Segment-B | |
|---|---|---|
| L5, L6, L20, L25 | L20, L21, L25, L26 | ... |

SUT Table 320

| Segment Identifier | LiveBlk 324 | Size 326 |
|---|---|---|
| Segment-A | 2 | 4 |
| Segment-B | 4 | 4 |
| Segment-C | ... | ... |
| ... | | |

322

Logical Map Table 330

| LgcBlk 332 | Segment Identifier 334 |
|---|---|
| L5 | Segment-A |
| L6 | Segment-A |
| L20 | Segment-B |
| L21 | Segment-B |
| L25 | Segment-B |
| ... | |

SHRINKING SEGMENT CLEANING ALGORITHM IN AN OBJECT STORAGE

BACKGROUND

The amount of data worldwide grows each year, thus requiring more storage resources. Further, protecting the already stored data (e.g., in a datacenter) against disastrous events, such as storage failure or cyber-attacks, which can completely disrupt the business operations, is essential for every enterprise. An enterprise needs to back up the data stored in its primary data storage(s) at some other storage devices (e.g., in the cloud) so that when the original data is damaged or lost, the backed up data can be restored (e.g., through a disaster recovery process) and used. As such, it is increasingly important to store backup data (e.g., related with virtual machines (VMs) or other types of virtual computing instances (VCIs) of a primary datacenter) in one or more other (e.g., remote) data storages, such as with low cost and high efficiency, such that in case of a disaster, a data recovery system (e.g., a secondary datacenter) can restore the backed up data and run (e.g., the virtual machines of the primary datacenter) in the shortest possible time.

Certain modern databases often use the write-optimized log-structured file system (LFS) data structure to store objects (e.g., in one or more logs or segments). Storing data using an LFS data structure significantly reduces write amplification, such as in situations where the storage system that is used to store the data does not allow for data overwrites. An example of datastores that do not allow for data overwrites includes the Amazon Simple Storage Service (S3), which is a cloud computing web service that provides an object storage through web services interfaces. As the amount of data (e.g., of the objects) stored in an object storage grows, an efficient data cleaning mechanism for freeing up and reclaiming space in the storage is highly desirable.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

As described, writing objects, such as virtual machine disks (VMDKs) of a datacenter to an object storage (e.g., in a log-structured file system (LFS) data structure) as continuous segments may result in significant reduction in write amplification. Write amplification may refer to a ratio of the size of the actual data written to a storage versus the size of data that is requested by a write operation to be written to the storage. As new objects (e.g., in new segments) are continuously added to an object storage, a segment cleaning mechanism may be needed to recycle the dead space (e.g., one or more dead data blocks in one or more segments that a deleted or modified object occupies).

In a conventional segment cleaning approach, a segment is read into memory and all data blocks in the segment are examined to determine which blocks of the segment are live blocks. Subsequently, live data blocks of the segment may be written out to a new segment (e.g., along with other live blocks) and the old segment may be deleted afterwards. After an object is written to one or more segments (e.g., as one or more data blocks), some portions of the object may be modified (e.g., changed or deleted). When the object is changed, one or more data blocks of the object that are changed may be written to one or more new segments of an LFS data structure. As such, the old data block(s) for which new data block(s) are added to the LFS data structure, or which are deleted, may be referred to as dead data blocks (or dead blocks). Conversely, other data blocks of a segment that are not dead (e.g., that still contain valid data) may be referred to as live data blocks (or live blocks).

During a conventional segment cleaning, as described above, since the location of the live data blocks are moved to new physical addresses (e.g., associated with the new segment(s)), all metadata pointing to the live data blocks may be required to be changed to point to the new physical addresses of the blocks. For example, a logical map table may include the logical block addresses (LBAs) of the data blocks (e.g., defined in a logical address space) mapped to physical block addresses (PBAs) of the data blocks (e.g., defined in a physical address space). In some embodiments, such as if metadata is maintained in a separate compute cluster, the changes to the metadata may require additional and inefficient usage of compute resources, such as processors and memory. For example, a segment cleaning process may determine which data blocks of a segment are live by examining metadata stored in a logical map table. After identifying and moving the live blocks, the segment cleaning process may have to update the LBAs of all moved blocks in the logical map table to be mapped to the new PBAs.

Accordingly, the present disclosure provides an efficient mechanism for segment cleaning in an object storage. In some embodiments, an object may include any object of a datacenter, such as a virtual machine disk (VMDK), a snapshot of a virtual machine (VM) or any other virtual computing instance (VCI) executing in the datacenter, etc. In some embodiments, the objects of the datacenter may be stored in a first data structure of an atomic object storage, while the metadata associated with the objects may be stored separately in a second data structure. For example, the objects may be stored in an LFS data structure (e.g., in the Amazon S3 cloud), while the metadata associated with the objects may be stored in a log-structured merge (LSM) tree data structure. An atomic data storage may include an atomic update with eventual consistency data storage in which a race condition with respect to input/output (I/O) operations on a segment happens in a sequential order but the result of a partially executed operation will never be exposed to other operations, such as when there are multiple I/O operations being executed on a segment at a time. For example, when a read instruction is executed on an atomic object storage to read data in a segment (e.g., using an identifier of the segment in the read instruction), and at the same time a write operation is being executed on the segment updating at least a portion of the data in the segment, the read operation may be guaranteed to return the segment data as having values corresponding to either prior to execution of the write operation or after full execution of the write operation, but not after only partial execution of the write operation.

The disclosed segment cleaning mechanism may eliminate additional operations on metadata associated with a segment that needs to be cleaned by storing, among other metadata, an identifier associated with the segment, instead of storing the offsets (e.g., physical block addresses) of the data blocks associated with the segment. That is, instead of having the LBAs mapped to their corresponding PBAs (e.g., in the logical map table), the LBAs may be mapped to identifiers of the segments in which the physical data exist. In some embodiments, a segment cleaner may read an old version of a segment that needs cleaning, determine which data block(s) of the segment are live, create a new version of the segment that includes only the live data blocks, and assign the same identifier of the old segment to the new segment before writing the new segment to the object storage. In some such embodiments, no additional metadata computation for storing the addresses of the moved live blocks (e.g., in the logical map table) may be needed. This way, when a new read instruction for the segment is received (e.g., from a client), irrespective of which version of the segment (e.g., the old version or the new version) is read from the object storage, the object storage may always return the requested data. Additionally, since the metadata associated with the segment may still point to the same segment identifier (ID), no additional changes in metadata may be required. Also, because there is no race condition with respect to the I/O operations on the segment, the metadata associated with the segment does not have to be locked during the I/O operations in some such embodiments.

Figure 1:
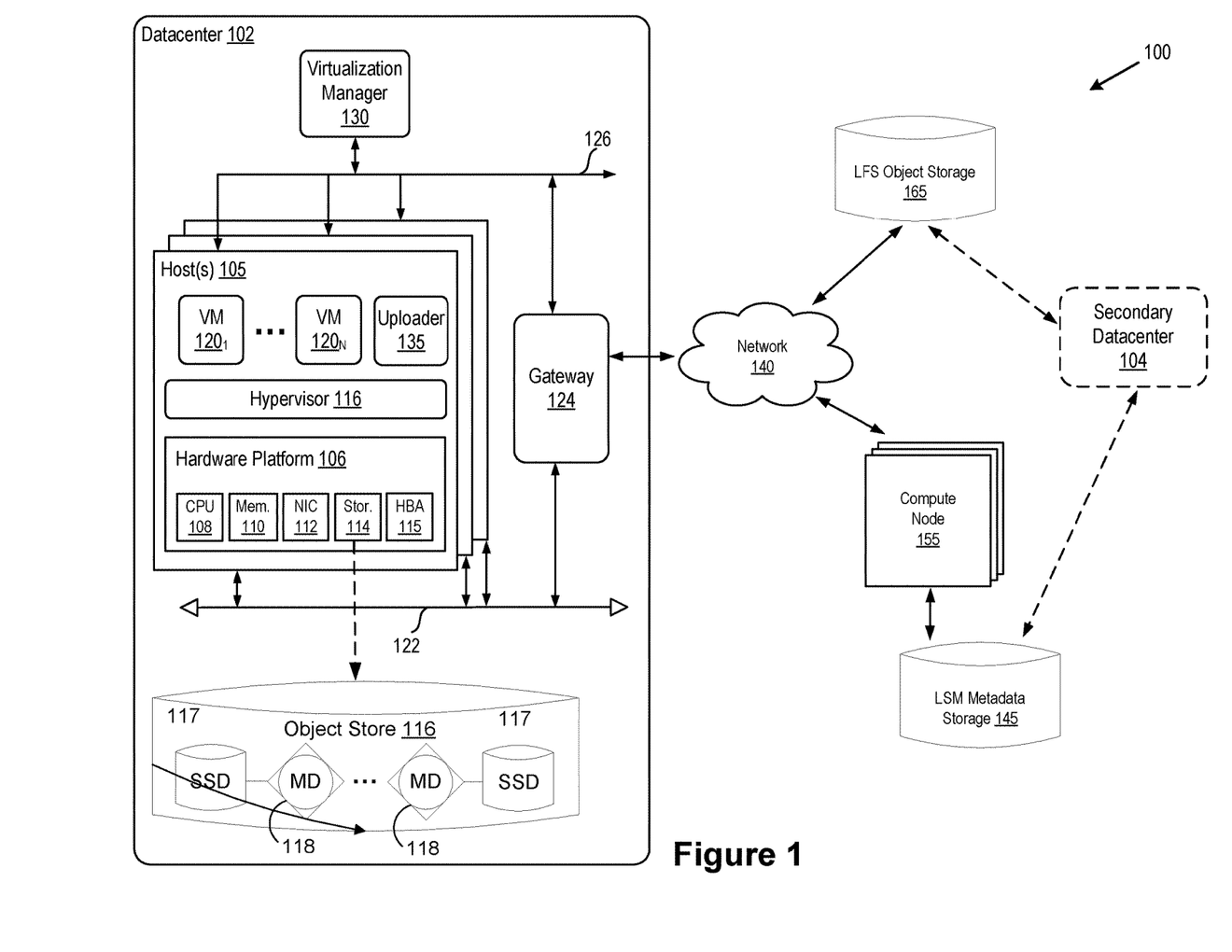
FIG. 1 is a block diagram illustrating a computer system in which one or more embodiments of the present application may be utilized.

FIG. 1 is a block diagram illustrating a computer system 100 in which one or more embodiments of the present application may be utilized. Computer system 100 may include a datacenter 102, a secondary datacenter 104, a network 140, several compute nodes 155, an object storage 165, and a metadata storage 145. Network 140 may be, for example, a direct link, a local area network (LAN), a wide area network (WAN), such as the Internet, another type of network, or a combination of one or more of these networks.

Datacenter 102 may include host(s) 105, a virtualization manager 130, a gateway 124, a management network 126, a data network 122, and an object store 116. Networks 122 and 126 may provide Layer 2 or Layer 3 connectivity in accordance with the Open Systems Interconnection (OSI) model, with internal physical or software defined switches and routers not being shown. Although management and data network 126 and 122 are shown as separate physical networks, it is also possible, in some implementations, to logically isolate the management network from the data network, e.g., by using different VLAN identifiers.

Each of hosts 105 may be constructed on a server grade hardware platform 106, such as an x86 architecture platform. For example, hosts 105 may be geographically co-located servers on the same rack. Hardware platform 106 of each host 105 may include components of a computing device such as one or more central processing units (CPUs) 108, system memory 110, a network interface 112, storage system 114, a host bus adapter (HBA) 115, and other I/O devices such as, for example, USB interfaces (not shown). Network interface 112 may enable host 105 to communicate with other devices via a communication medium, such as data network 122 or management network 126. Network interface 112 may include one or more network adapters, also referred to as Network Interface Cards (NICs). In certain embodiments, data network 122 and management network 126 may be different physical networks, as shown, and the hosts 105 may be connected to each of the data network 122 and management network 126 via separate NICs or separate ports on the same NIC. In certain embodiments, data network 122 and management network 126 may correspond to the same physical or software defined network, but different network segments, such as different VLAN segments.

Storage system 114 may represent persistent storage devices (e.g., one or more hard disks, flash memory modules, solid state disks, non-volatile memory express (NVMe) drive, persistent memory devices, and/or optical disks). Storage 114 may be internal to host 105, or may be external to host 105 and shared by a plurality of hosts 105, coupled via HBA 115 or NIC 112, such as over a network. Storage 114 may be a storage area network (SAN) connected to host 105 by way of a distinct storage network (not shown) or via data network 122, e.g., when using iSCSI or FCoE storage protocols. Storage 114 may also be a network-attached storage (NAS) or another network data storage system, which may be accessible via NIC 112.

Local storages 114 housed in, or directly attached to, host machines 105, may provide an aggregate object store 116 for virtual machines (VMs) 120 running on hosts 105. As shown and described, object storage 116 may include combinations of solid state drives (SSDs) or non-volatile memory express (NVMe) drives 117, magnetic or spinning disks or slower/cheaper SSDs 118, or other types of storages. The objects stored in object store 116 may include file system objects and other VM related objects, such as virtual disks (VMDKs) of the VMs, etc.

System memory 110 may be hardware allowing information, such as executable instructions, configurations, and other data, to be stored and retrieved. Memory 110 is where programs and data are kept when CPU 108 is actively using them. Memory 110 may be volatile memory or non-volatile memory. Memory 110 may also include a cache that includes cached copies of storage blocks of objects in storage 114 or object store 116. The cached storage blocks in cache may be fetched into memory 110 during different memory operations, such as memory read/write, deduplication, etc.

Host 105 may be configured to provide a virtualization layer, also referred to as a hypervisor 116, that abstracts processor, memory, storage, and networking resources of hardware platform 106 into multiple virtual machines $120_1$ to $120_N$ (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine.

It should be noted that although the disclosure is described with reference to VMs, the embodiments described herein also apply to other types of virtual computing instances (VCIs), such as containers, Docker containers, data compute nodes, isolated user space instances, namespace containers, and the like. In certain embodiments, instead of VMs 120, the techniques may be performed using containers that run on host 105 without the use of a hypervisor and without the use of a separate guest operating system running on each container.

Virtualization manager 130 may communicate with hosts 105 via a network, shown as a management network 126, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual computing instance (e.g., a VM) in one of hosts 105. Although shown as a single unit, virtualization manager 130 may be implemented as a distributed or clustered system. That is, virtualization manager 130 may include multiple servers or virtual computing instances that implement management plane functions.

Although hosts 105 are shown as comprising a hypervisor 116 and virtual machines 120, in an embodiment, hosts 105 may comprise a standard operating system instead of a hypervisor 116, and hosts 105 may not comprise VMs 120. In this embodiment, data center 102 may not comprise virtualization manager 130.

Gateway 124 may provide hosts 105, VMs 120, and other components in data center 102 with connectivity to one or more networks used to communicate with one or more remote datacenters and/or other devices/servers, such object storage 165, compute nodes 155, secondary datacenter 104, etc., for example, through network 140. Gateway 124 may manage external public Internet Protocol (IP) addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual appliance, a physical device, or a software module running within host 105.

Host 105 may also include an uploader manager 135 which may manage uploading data to object storage 165 and compute nodes 155 for backup in some embodiments. Although shown as a VM, uploader manager 135 may be any other type of VCI, such as a container, a data compute node, an isolated user space instance, etc., in some embodiments. Additionally, uploader manager 135 may be an agent (e.g., a module) running in hypervisor 116 (or other operating system) of host 105 in some embodiments. In some embodiments, uploader manager 135 may be part (e.g., a submodule) of a storage management module (also referred to as a vSAN module) that automates storage management workflows (e.g., creates objects in object store 116, etc.) and provides access to objects in object store 116 (e.g., handle I/O operations on objects in the object store, etc.) based on predefined storage policies specified for objects in the object store. For example, because a VM may be initially configured by an administrator to have specific storage requirements for its "virtual disk" depending on its intended use (e.g., capacity, availability, input/output operations per second (TOPS), etc.), the administrator may define a storage profile or policy for each VM specifying such availability, capacity, TOPS and the like. As such, the vSAN module may then create an "object" for the specified virtual disk by backing it with physical storage resources of object store 116 based on the defined policy.

Uploader manager 135 may receive object data stored in object store 116 and send the data to object storage 165 (e.g., in the cloud) to be stored as backup data for the object. The data may include different snapshots (e.g., backups, delta backups containing only changed data since a previous backup, etc.) of the object taken at different points of time. In some embodiments, uploader manager 135 may send the first snapshot of the object to the data storage 165 and subsequently send only the snapshot differences (may also be referred to as "snapshot cliffs", or "Jiffs") to the data storage to be backed up. Additionally, in some embodiments, uploader manager may send information associated with the object, such as object ID, snapshot ID, logical block addresses (LBAs) in which the object is stored, etc., to a set of one or more compute nodes 155. In some embodiments, in addition to objects and their snapshots, uploader manager 135 may store files (and their snapshots) in object storage 165 or another remote storage for backup purposes and send information associated with the stored files to compute nodes 155 to create, manage, and store metadata associated with the files.

The objects may be stored in a log-structured file system (LFS) format in object storage 165 in a set of one or more segments as multiple chunks of data. In some embodiments, each object may be stored in fixed block sizes of data (e.g., each block being 4 kilobytes (KB) or smaller, for example, when data is compressed) in one or more segments that have fixed segment sizes (e.g., 4 megabyte (MB) for each segment) in object storage 165. Each fixed block size may also be called a chunk of data or simply a chunk in some embodiments. It should be noted that when files are stored in object storage 165 (or any other storage), the chunks may have different sizes (e.g., that are defined on a byte-boundary basis using, for example, robin hash fingerprints) in some embodiments.

In some embodiments, the set of compute nodes 155 may receive information associated with the objects stored in object storage 165 (e.g., as a plurality of chunks), generate metadata associated with each object based on the received information, and store the generated metadata in an LSM tree data structure in metadata storage 145. Metadata storage 145 and object storage 165, in some embodiments, may be stored in public cloud (e.g., Amazon S3) even though they are separate storages. Additionally, the metadata storage and object storage may be part of storage resources of a cloud computing system that in combination with datacenter 102 may render a hybrid cloud. For example, the hybrid cloud may include a public cloud (not shown in the figure) and an on-premise datacenter, such as datacenter 102.

As shown in FIG. 1, compute nodes 155 may interact with metadata storage 145 to create, update, and manage metadata tables. In some embodiments, all or some of the metadata tables stored in metadata storage 145 may be key-value tables. A key-value table, in some embodiments, may include a table ordered by keys that when given a key, may return a value that is mapped to that key.

In case of a failure in datacenter 102 (e.g., when part or all of the data stored in object store 116 is damaged or lost, when datacenter 102 is under a cyber-attack, etc.), a secondary or recovery datacenter, such as secondary datacenter 104, may use the metadata stored in the metadata storage 145 to retrieve the backed up data (e.g., objects and/or files)

stored in object storage 165. After retrieving the backup data (e.g., snapshots of the VMDKs), secondary datacenter 104 may use the data to recreate the objects (e.g., the virtual disks) and run the VMs of datacenter 102. The organization of metadata in metadata storage 145 and object data in object storage 165 may allow secondary datacenter 104 to be up and running in a short period of time after a failure (e.g., occurrence of a disastrous event) in the primary datacenter 102.

It should be noted that in some embodiments, the object data and its associated metadata may not necessarily include only the backup data. For example, instead of, or in conjunction with, the backup data, the object data and its associated metadata may include original data related to the objects that are stored in the public cloud, for example, due to lack of enough space in datacenter 102. For example, because storage resources, such as storage 114, provided by on-premise datacenter 102 may be limited, data produced or stored within on-premise datacenter 102 may, in some embodiments, be transmitted to a cloud computing system for storage in storages 145 and 165 among other storage resources of the public cloud. In such cases, a file system(s) (e.g., a distributed file system) operating within on-premise datacenter 102 may be configured to utilize storage resources of the public cloud as secondary storage resources. In one example, the file system may be configured to cache hot data in object store 116 and overflow cold data into storage resources of the public cloud including storage 165. In other words, in such an example, object storage 116 may be used by the file system as a read cache and write-back staging area, while the storage resources of the public cloud may be treated as disk storage. Hot data may refer to data that is frequently accessed in some embodiments, while cold data may refer to data that is accessed less often.

As described above, the objects of a datacenter, such as datacenter 102 may be stored in sequential segments in an LFS data structure in object storage 165. For example, each object may include one or more data blocks that occupy one or more segments in the object storage 165. As new objects (e.g., VMDKs) are continuously added to object storage 165, a segment cleaner needs to recycle the dead data blocks to reclaim space in the object storage. The segment cleaner may read the segments in object storage 165 and determine (e.g., based on the number of dead data blocks) which segments need to be recycled. Once the segment cleaner determines that an old segment needs recycling, the segment cleaner may store a new segment that has the same identifier assigned to it as the old segment and move the live blocks of the old segment to the new segment. Since object storage 165 may support atomic updates with eventual consistency in some embodiments, until the space in the old segment is not reclaimed (e.g., to store new data), if a read instruction is received by block storage 165, either all of the old or new segment may be returned as having the correct data.

Figure 2:
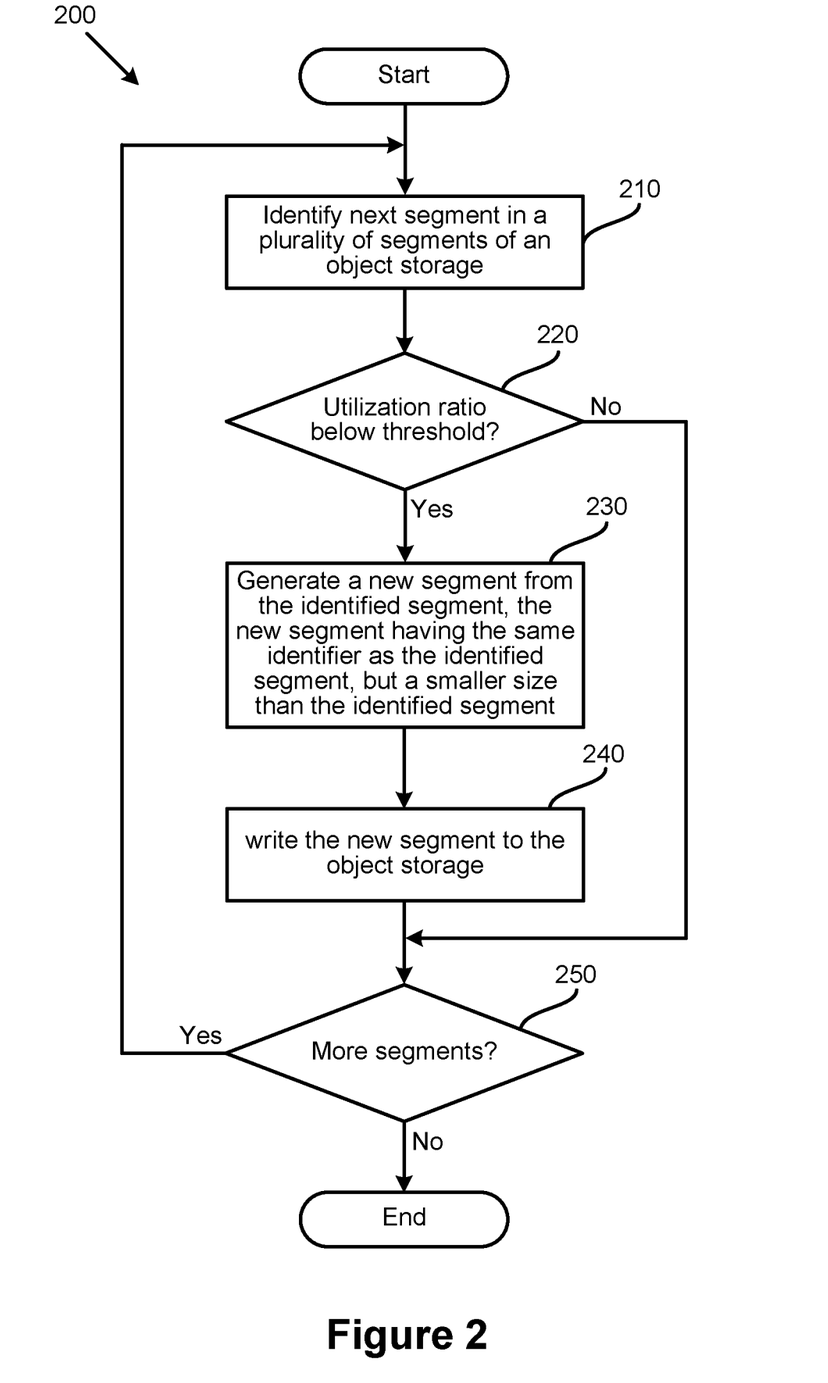
FIG. 2 is a flowchart illustrating a method (or process) for segment cleaning in an object storage, according to example embodiments of the present application.

FIG. 2 is a flowchart illustrating a method (or process) 200 for segment cleaning in an object storage, according to example embodiments of the present application. Process 200 may be performed by a segment cleaner. The segment cleaner may include a physical computing device (e.g., a host machine) or a VCI (e.g., a VM). The physical or virtual computing device may be part of a datacenter, such as datacenter 102 (as shown in FIG. 1) or part of a public cloud (e.g., when utilizing a hybrid cloud architecture).

Process 200 may start by identifying, at 210, the next segment in a plurality of segments of an LFS data structure (e.g., in object storage 165). If process 200 is performed for the first time, the process may identify the first segment in the LFS data structure. Next, process 200 may determine, at 220, whether a utilization ratio of the identified segment is below a threshold. Process 200 may make such a determination by first identifying the data blocks in the identified segment. To identify the data blocks, the process may examine metadata associated with the segment that is indicative of, among other information, the data blocks kept in the segment. The data block information may be part of segment summary information that may be kept in the same segment (e.g., as the data blocks are kept) in some embodiments, or kept with other metadata that is stored separately (e.g., in an LSM tree) in other embodiments.

After identifying the data blocks of a segment, process 200 may receive information associated with the utilization ratio of the segment from a segment usage table (SUT). A SUT, in some embodiments, may include segment related information, such as a segment index, number of live data blocks in the segment, and also the segment size (e.g., the total number of data blocks in the segment). A segment utilization ratio may be calculated by dividing the number of live blocks in the segment by the size of the segment in some embodiments. The threshold for determining utilization ratio may be, for example, a percentage (e.g., 20%, 30%, etc.) of the size of a segment.

If process 200 determines, that the utilization ratio of the identified segment is not less than a defined threshold (e.g., at 220), the process may proceed to 250, which is described below. On the other hand, if process 200 determines that the utilization ratio of the identified segment is less than (or equal to) the threshold, the process may generate, at 230, a new segment from the identified segment. To do so, process 200 may identify the live blocks of the segment and store them together in the new segment. In some embodiments, the live blocks in a segment may be identified using a particular table, such as a logical map table. The logical map table may be stored, among other metadata tables, in a storage (e.g., metadata storage 145 shown in FIG. 1) separate from the object storage in some embodiments. A logical map table may include logical block addresses of the live data blocks and their corresponding segment IDs to which the logical block addresses are mapped. In some embodiments, the logical map table may include additional information, such as snapshot IDs corresponding to the logical block addresses. For example, an entry of the logical map table may indicate a snapshot ID (e.g., ID #1) is stored in a logical block (e.g., LBA #5) which is mapped to a segment (e.g., Seg #10).

In some embodiments, process 200 may assign the same identifier to the newly generated segment as the identifier of the identified segment (e.g., the segment that is being recycled). In some embodiments, the input/output (I/O) operations on an object storage may be performed using the segment identifiers. For example, for reading a segment, a read instruction may include the identifier of the segment as part of the instruction that is sent to the object storage. Based on the segment ID, the object storage may return the segment in response to the read instruction. For example, based on the segment ID, the LBAs of data blocks that are in the segment may be identified (e.g., from a segment summary block associated with the segment ID). The identified LBAs may then be read sequentially in the segment to return the requested data. After assigning the identifier, process 200 may write, at 240, the new segment to the object storage. Since the new segment has the same identifier as the old segment that is being recycled, the mapping of the live blocks in the logical map table may not be changed for the new segment. That is, after recycling of an old segment, process 200 does not have to make any modification to the logical map table (e.g., which may be stored in a separate data storage), hence saving a lot of computing resources.

After storing the new segment having the live blocks of the old segment and the same identifier as the old block to the LFS data structure, process 200 may determine, at 250, whether any more segments are left (e.g., in the LFS data structure or a portion of the LFS data structure) for segment cleaning. If process 200 determines that there are additional segments in the LFS data structure, the process may return to 210 to identify the next segment and to repeat operations 220-250 for the next identified segment. If the process determines that no more segment is left to examine for recycling, the process may end.

The specific operations of process 200 may not be performed in the exact order shown and described. Additionally, the specific operations may not be performed in one continuous series of operations, and different specific operations may be performed in different embodiments. For example, in some embodiments, before (or after) writing, at 240, the new segment to the object storage, process 200 may update the SUT to include the new size of the segment in this table. For example, if a data entry in the SUT indicated that the old segment had a size of 16 data blocks, and after recycling, the size of new segment becomes 5 (e.g., when the number of live data blocks is 5), the process may change the size field in the data entry from 16 to 5 after generating the new segment, or alternatively, after writing the new segment to the object storage. More examples of logical map table and SUT and their usage is segment cleaning operations are described below, with reference to FIGS. 3 and 4.

Figure 3:
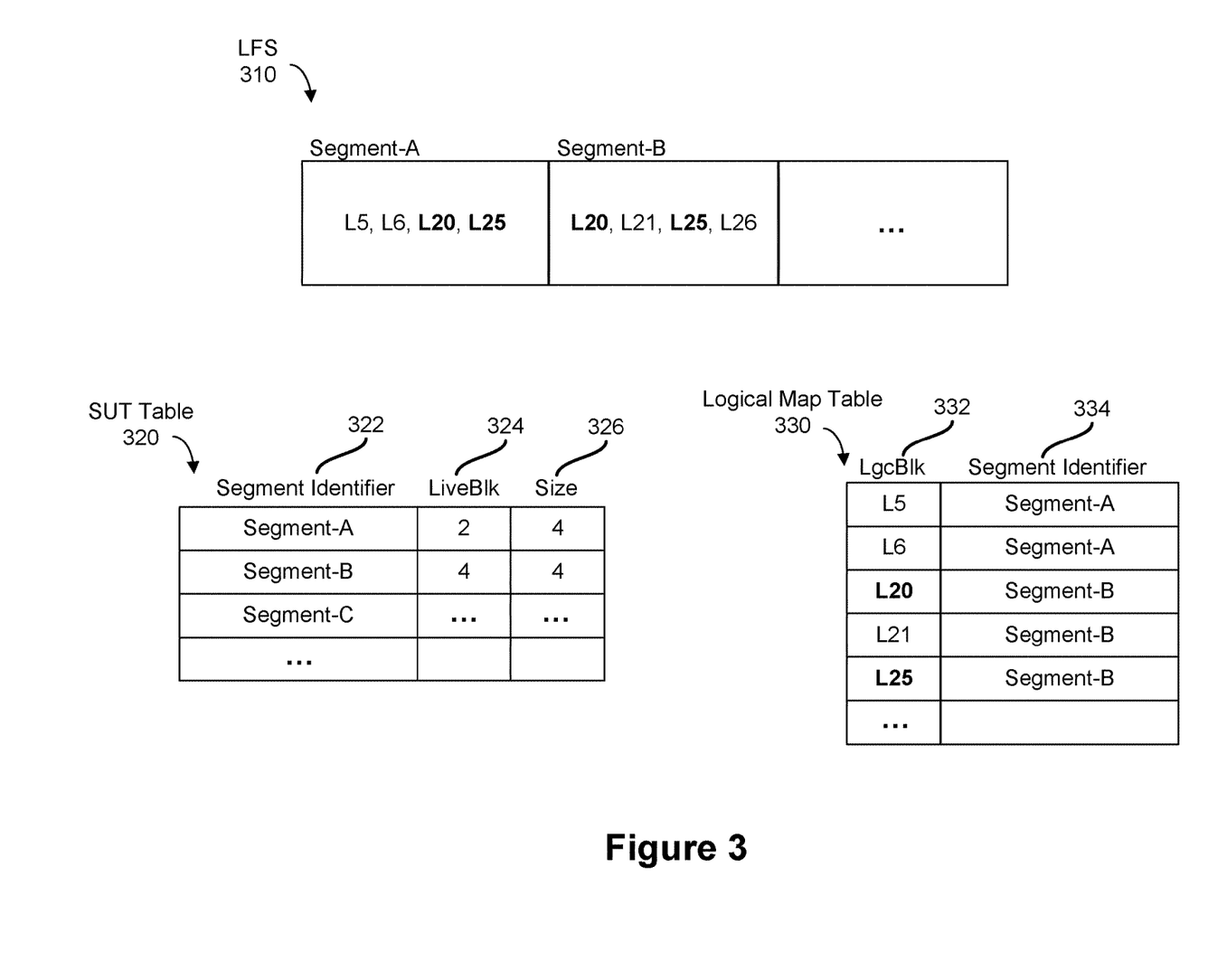
FIG. 3 illustrates an LFS data structure having multiple segments and usage of a segment usage table (SUT) and logical map table in segment cleaning (or recycling) of the LFS data structure, according to an example embodiment of the present application.

FIG. 3 illustrates a LFS data structure having multiple segments and usage of a SUT and logical map table in segment cleaning (or recycling) of the LFS data structure, according to an example embodiment of the present application. As shown in the figure, LFS data structure 310 may include several continuous segments including a first segment having a segment ID of Segment-A and a second segment having a segment ID of Segment-B. Segment-A, as shown, may include four data blocks having logical block addresses (LBAs) of L5, L6, L20, and L25. Segment-B may also include four data blocks having LBAs of L20, L21, L25, and L26. For example, LFS data structure 310 may have received a first write instruction to write an object that includes LBAs L5, L6, L20, and L25 in segment Segment-A. A little while later, LFS data structure 310 may have received another write instruction to write the object, this time including LBAs L20, L21, L25, and L26 in segment Segment-B. As the result of the second write instruction, LBAs L20 and L25 in the first block (Segment-A) do not include valid data and therefore are dead.

It should be noted that this type of overwrite is only one method of data writing that may result in one or more old data blocks becoming invalid (or dead). In some other embodiments, the object storage may receive subsequent messages that result in having the old data dead. For example, in some such embodiments, the object storage may receive a first write instruction to write an object that includes LBAs L5, L6, L20, and L25 in segment Segment-A. Subsequently, the object storage may receive a message that includes an LBA mapped to an operation (e.g., L20, Delete). That is, instead of overwriting one or more LBAs by receiving new LBAs, the object storage may receive new messages that include key-value pairs with an LBA as the key in each message mapped to an operation (e.g., delete, insert, replace, etc.).

Continuing with FIG. 3, as shown, SUT table 320 may include an entry for each segment of LFS data structure 310 that may indicate a segment identifier 322, a number of live blocks 324 associated with the segment, and a size 326 of the segment. As shown in the table, Segment-A includes 2 live blocks and a total size of 4 (e.g., data blocks), while Segment-B includes 4 live blocks and a total size of 4 (e.g., data blocks).

Logical map table 330 of FIG. 3 also shows that each entry of the table may include an LBA 332 mapped to a segment identifier 334. For example, LBAs L5 and L6, as shown in table 330, are mapped to segment Segment-A, while LBAs L20, L21, and L25 are mapped to segment Segment-B.

As described above, for example, with reference to FIG. 2, a segment cleaner may identify Segment-A as a candidate segment for recycling during a segment cleaning process. The segment cleaner may make such determination based on the data received from SUT table 320. For example, since the utilization ratio calculated for Segment-A indicates a 50% utilization (e.g., live block number 324 divided by size 326), the segment cleaner may decide to recycle this segment. As such, the segment cleaner may first read the segment summary information associated with Segment-A and determine that this segment includes data blocks L5, L6, L20, and L25.

Thereafter, the segment cleaner may identify the live data blocks in the segment by reading the information in logical map table 330. Based on the mapping of the logical blocks, the segment cleaner may determine that even though logical blocks L20 and L25 are in segment Segment-A, they are currently mapped to segment Segment-B in the logical map table. As, such, the segment cleaner may determine that logical blocks L20 and L25 within Segment-A are dead. Therefore, the segment cleaner may move the live data blocks of Segment-A (e.g., L5 and L6) to a new segment to recycle Segment-A and make room for additional data.

Figure 4:
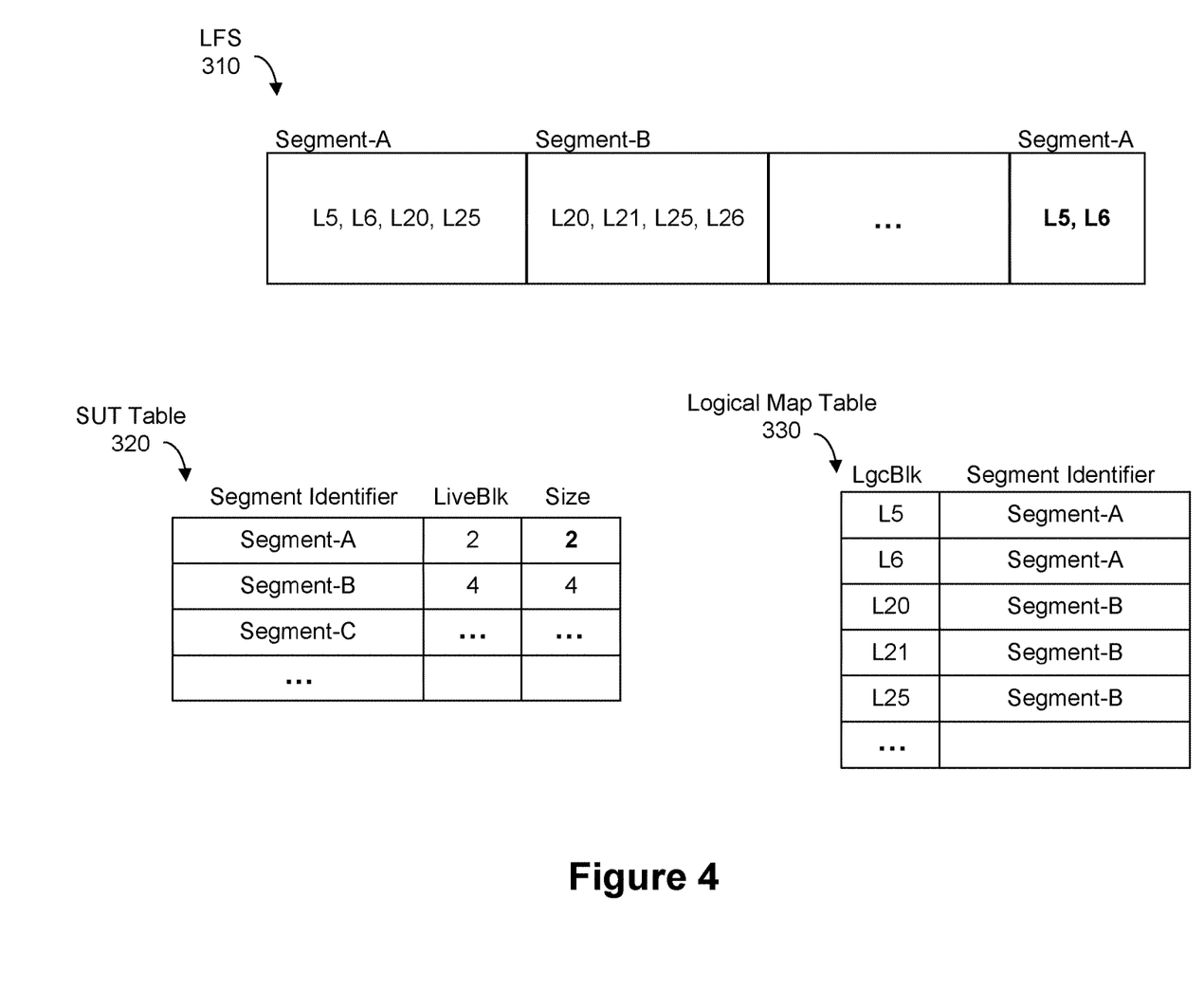
FIG. 4 illustrates the LFS data structure, SUT, and logical map table of FIG. 3 after one of the segments is recycled as a result of a segment cleaning process, according to an example embodiment of the present application.

FIG. 4 illustrates the LFS data structure, SUT, and logical map table of FIG. 3 after one of the segments is recycled as a result of a segment cleaning process, according to an example embodiment of the present application. As shown in the figure, LFS data structure 310 may include the same several continuous segments including segments Segment-A and Segment-B, as shown in FIG. 3, with the exception that in FIG. 4 a new segment Segment-A is also added to LFS data structure 310. This is because the segment cleaning process, as described above with reference to FIG. 3, has determined that logical blocks L5 and L6 in Segment-A are live, and therefore has generated and stored a new segment in the LFS data structure that only includes these two live blocks. As can be seen in FIG. 4, the segment cleaner has also assigned the same identifier Segment-A to the newly added segment.

Also, as shown in FIG. 4, the entry associated with the recycled segment has been updated (e.g., by the segment cleaner) in SUT table 320. That is, the segment cleaner has updated the first entry in SUT table 320 to include a total size of 2 (e.g., data blocks) as well as two live blocks associated with Segment-A. Since the size of this segment is now 2, any future segment cleaning process may not select this segment as a good candidate for segment cleaning simply because the utilization ratio for the segment is now 100% (e.g., the number of live blocks in the segment divided by the total size of the segment).

Additionally, as can be seen in the figure, none of the entries in logical map table 330 has been updated as the result of the recycling process and addition of a new segment Segment-A to the end of the LFS data structure. This is because the recycled and new segment share the same identifier (e.g., Segment-A) and in the logical map table, the LBAs are mapped to the segment IDs. Therefore, there is no need for making any changes to the logical map table.

As described above, if the object storage receives a read instruction (e.g., from a client) that specifies Segment-A as the segment that has to be read, the object storage may return either of the segments that is associated with the segment ID in the read instruction (e.g., Segment-A), since in either case, the right data (e.g., L5 and L6) may be returned in response to the read instruction.

It should be noted that eventually and after passage of time, object storage may reclaim the space in old segment Segment-A, as this segment is tagged as a recycled segment, by storing new data to this segment.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory, persistent memory, solid state disk (e.g., a flash memory device), NVMe device, a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for cleaning an object storage having a plurality of segments, each segment having an identifier through which the segment is accessed, comprising:
   identifying a first segment in the plurality of segments, the first segment having a first identifier and a first size wherein each segment of the plurality of segments comprises one or more data blocks that are either live or dead, wherein the first segment comprises at least one dead data block that is not included in a second segment;
   determining that a utilization ratio for the first segment is below a threshold;
   generating the second segment from the first segment, the second segment having a second identifier that is the same as the first identifier and a second size that is smaller than the first size; and
   writing the second segment to the object storage where a table stores data that indicates a corresponding identifier, a corresponding number of live data blocks, and a corresponding size of each of the plurality of segments, the method further comprising updating the table to include the second size as a size of the first segment.

2. The method of claim 1, wherein the utilization ratio for the first segment comprises a ratio between a number of live blocks of the first segment and the size of the first segment.

3. The method of claim 1, further comprising:
   receiving a first read instruction comprising the first identifier;
   returning the first segment in response to receiving the first read instruction;
   receiving a second read instruction comprising the first identifier; and
   returning the second segment in response to receiving the second read instruction.

4. The method of claim 1, wherein the object storage comprises an atomic update with eventual consistency data storage.

5. The method of claim 1, wherein a table stores a plurality of key-value pairs, each key-value pair comprising a logical block address that is mapped to a segment identifier of a segment of the plurality of segments in the object storage, the method further comprising, after identifying the first segment:
   identifying one or more logical blocks stored in the first segment by reading metadata associated with the first segment; and
   determining which of the one or more logical blocks is a live block using the table, wherein the utilization ratio for the first segment is determined based on a number of live blocks in the first segment and the first size of the first segment.

6. The method of claim 5, wherein the second segment comprises only live blocks of the first segment, wherein the table is not updated for the second segment after generating the second segment from the first segment.

7. A non-transitory computer readable medium comprising instructions that, when executed by one or more processors of a computing system, cause the computing system to perform a method for cleaning an object storage having a plurality of segments, each segment having an identifier through which the segment is accessed, the method comprising:
   identifying a first segment in the plurality of segments, the first segment having a first identifier and a first size wherein each segment of the plurality of segments comprises one or more data blocks that are either live or dead, wherein the first segment comprises at least one dead data block that is not included in a second segment;
   determining that a utilization ratio for the first segment is below a threshold;
   generating the second segment from the first segment, the second segment having a second identifier that is the same as the first identifier and a second size that is smaller than the first size; and
   writing the second segment to the object storage wherein a table stores data that indicates a corresponding identifier, a corresponding number of live data blocks, and a corresponding size of each of the plurality of segments, the method further comprising updating the table to include the second size as a size of the first segment.

8. The non-transitory computer readable medium of claim 7, wherein the utilization ratio for the first segment comprises a ratio between a number of live blocks of the first segment and the size of the first segment.

9. The non-transitory computer readable medium of claim 7, the method further comprising:
   receiving a first read instruction comprising the first identifier;
   returning the first segment in response to receiving the first read instruction;
   receiving a second read instruction comprising the first identifier; and
   returning the second segment in response to receiving the second read instruction.

10. The non-transitory computer readable medium of claim 7, wherein a table stores a plurality of key-value pairs, each key-value pair comprising a logical block address that is mapped to a segment identifier of a segment of the plurality of segments in the object storage, the method further comprising, after identifying the first segment:
    identifying one or more logical blocks stored in the first segment by reading metadata associated with the first segment; and
    determining which of the one or more logical blocks is a live block using the table, wherein the utilization ratio for the first segment is determined based on a number of live blocks in the first segment and the first size of the first segment.

11. The non-transitory computer readable medium of claim 10, wherein the second segment comprises only live blocks of the first segment, wherein the table is not updated for the second segment after generating the second segment from the first segment.

12. A computer system, comprising:
    a memory; and
    a processor coupled to the memory, the processor being configured to:
      identify a first segment in a plurality of segments, the first segment having a first identifier and a first size wherein each segment of the plurality of segments comprises one or more data blocks that are either live or dead, wherein the first segment comprises at least one dead data block that is not included in a second segment;
      determine that a utilization ratio for the first segment is below a threshold;

generate the second segment from the first segment, the second segment having a second identifier that is the same as the first identifier and a second size that is smaller than the first size; and write the second segment to an object storage wherein a table stores data that indicates a corresponding identifier, a corresponding number of live data blocks, and a corresponding size of each of the plurality of segments, the processor being further configured to update the table to include the second size as a size of the first segment.

13. The computer system of claim 12, wherein the utilization ratio for the first segment comprises a ratio between a number of live blocks of the first segment and the size of the first segment.

14. The computer system of claim 12, wherein the processor is further configured to:

receive a first read instruction comprising the first identifier;

return the first segment in response to receiving the first read instruction;

receive a second read instruction comprising the first identifier; and return the second segment in response to receiving the second read instruction.

* * * * *